United States Patent [19]

Fry

[11] 4,196,403
[45] Apr. 1, 1980

[54] MULTI-LINE AMMONIA LASER UTILIZING INTRA-MOLECULAR ENERGY TRANSFER VIA A BUFFER GAS

[75] Inventor: Stephen M. Fry, Woodland Hills, Calif.

[73] Assignee: Hughes Aircraft Company, Culver City, Calif.

[21] Appl. No.: 826,788

[22] Filed: Aug. 22, 1977

[51] Int. Cl.² .............................................. H01S 3/00
[52] U.S. Cl. ......................... 331/94.5 G; 331/94.5 D; 331/94.5 P
[58] Field of Search ..................... 331/94.5 G, 94.5 P; 330/4.3

[56] References Cited

PUBLICATIONS

Gullberg et al., Physica Scripta, vol. 8, (1973), pp. 177–182.
Chang et al., Applied Physics Letters, vol. 28, No. 9, 5/1/1976, pp. 526–528.
Danielewicz et al., Applied Physics Letters, vol. 29, No. 9, 11/1/1976, pp. 557–559.
Chang et al., Applied Physics Letters, vol. 29, No. 11, 12/1/1976, pp. 725–727.
Garing et al., J. Molecular Spectroscopy, vol. 3, (1959), pp. 496–527.
Chang, Optics Communications, vol. 2, No. 2, Jul. 1970, pp. 77–80.

*Primary Examiner*—William D. Larkins
*Attorney, Agent, or Firm*—Paul M. Coble; W. H. MacAllister

[57] ABSTRACT

The disclosed laser employs a working gas comprising ammonia and a buffer gas which is chemically non-reactive with ammonia. A pumping laser beam at a wavelength of 9.2 μm, provided by a carbon dioxide laser tuner to the R(30) transition of the 001–020 band, irradiates the working gas to excite ammonia molecules from the symmetric ground state to the anti-symmetric $\nu_2=1$ vibrational manifold. Collisions with buffer gas molecules cause the excited ammonia molecules to undergo intra-molecular energy transfer to a plurality of energy levels in the symmetric $\nu_2=1$ vibrational manifold. Laser oscillation is achieved simultaneously on a plurality of $\nu_2=1$ to ground transitions in the wavelength range extending from about 9.3 μm to about 13.8 μm.

4 Claims, 3 Drawing Figures

MULTI-LINE AMMONIA LASER UTILIZING INTRA-MOLECULAR ENERGY TRANSFER VIA A BUFFER GAS

BACKGROUND OF THE INVENTION

This invention relates to lasers, and more particularly, it relates to a multiple wavelength ammonia laser pumped by a carbon dioxide laser.

Recently there has been increased interest in laser-pumped lasers wherein a laser beam from a first laser is used to pump a second laser which provides the desired output beam. This type of laser finds application in a number of fields including isotope separation, laser photochemistry, high resolution spectroscopy, and air pollution monitoring.

In the foregoing and other applications it is often necessary to utilize a laser beam at a particular frequency. Since the frequency of a laser beam depends upon the energy level structure of the medium used in generating the beam, if one desires a laser beam at a particular frequency he must select the particular laser that most closely fits the desired frequency condition. Since there are some desired frequencies which do not match any laser output frequency, a need exists for developing lasers which can be tuned to provide an output at any desired frequency in a range of frequencies.

In the case of a gas laser, tunability can usually be enhanced by increasing the pressure of the gaseous working medium and thereby Lorentz broaden the linewidth of the lasing transition. Since lasers excited by means of an electric discharge have a tendency to arc at high operating gas pressures, and since some laser beams are closely matched in energy to absorbing transitions in certain laser gases, laser-pumped lasers offer great potential for providing tunable lasers of high efficiency and reliability.

One particular laser-pumped laser combination which is receiving attention in the scientific community involves optically pumping ammonia ($NH_3$) with the output from a carbon dioxide ($CO_2$) laser. Carbon dioxide lasers are not only readily available, but these lasers provide output wavelengths near ammonia absorption resonances. In fact, both the absorption spectra of the ammonia molecule and the output lines from carbon dioxide lasers have been studied extensively and are well tabulated (see, for example, J. S. Garing et al, "The Low-Frequency Vibration Rotation Bands of the Ammonia Molecule", *Journal of Molecular Spectroscopy*, Vol. 3 (1959), pages 496-527; T. Y. Chang, "Accurate Frequencies and Wavelengths of $CO_2$ Laser Lines", *Optics Communications*, Vol. 2, No. 2 (July 1970), pages 77-80; and E. D. Hinkley et al "Long-Path Monitoring: Advanced Instrumentation with a Tunable Diode Laser", *Applied Optics*, Vol. 15, No. 7 (July 1976), pages 1653-1655).

In recent years a variety of ammonia lasers have been developed pumped by different carbon dioxide laser lines and providing respective outputs at different ammonia transition wavelengths. Initially, ammonia output wavelengths were obtained generally in the 30 μm to 400 μm range using transitions between different rotational energy levels within the same vibrational manifold (see K. Gullberg et al, "Submillimeter Emission from Optically Pumped $^{14}NH_3$", *Physica Scripta*, Vol. 8 (1973), pages 177-182). More recently, several additional ammonia output lines have been achieved at shorter wavelengths ranging from 11.46 μm to 12.81 μm using transitions between the $\nu_2=1$ and the ground vibrational manifolds (see T. Y. Chang et al, "Laser Action at 12.812 μm in Optically Pumped $NH_3$", *Applied Physics Letters*, Vol. 28, No. 9 (May 1, 1976), pages 526-528; E. J. Danielewicz et al, "High-Power Vibration-Rotation Emission from $^{14}NH_3$ Optically Pumped Off Resonance", *Applied Physics Letters*, Vol. 29, No. 9 (Nov. 1, 1976), pages 557-559; and T. Y. Chang et al, "Off-Resonant Infrared Laser Action in $NH_3$ and $C_2H_4$ Without Population Inversion", *Applied Physics Letters*, Vol. 29, No. 11 (Dec. 1, 1976), pages 725-727).

A particular carbon dixoide laser line which has been useful in pumping ammonia to produce laser radiation at 12.08 μm as well as at 67 μm is the R(30) carbon dioxide laser line at 9.2 μm. However, in the past, neither the R(30) carbon dioxide line nor any other laser line had ever produced simultaneous lasing of a plurality of ammonia lines in the 9-14 μm wavelength range. Moreover, all known ammonia laser lines previously had been generated either by direct optical pumping or by optical pumping followed by lasing to the upper energy level of the desired laser transition.

SUMMARY OF THE INVENTION

It is an object of the present invention to provide an ammonia laser which lases simultaneously on a plurality of ammonia lines in the 9-14 μm wavelength range.

It is a further object of the invention to provide a laser-pumped laser which generates a sufficient number of different output wavelengths appropriately spaced over a relatively wide wavelength range so as to readily facilitate pressure broadening to achieve tunability of the laser output over an exceptionally wide wavelength range.

It is a still further object of the invention to provide an ammonia laser which may be tuned to provide an output at any wavelength over substantially the 9-14 μm wavelength range.

It is yet another object of the invention to provide a laser-pumped ammonia laser which employs a unique pumping mechanism involving intra-molecular energy transfer by means of a buffer gas to not only populate the upper levels of lasing transitions, but also to deplete the lower levels of the lasing transitions and replenish the lower level of the pumping transition so as to achieve an enhanced pumping effect.

A laser according to the invention employs a working gas comprising ammonia and a buffer gas which is chemically non-reactive with ammonia. A pumping laser beam at a wavelength of approximately 9.2 μm, provided by a carbon dioxide laser tuned to the R(30) transition of the 001-020 band, irradiates the working gas to excite ammonia molecules from the symmetric ground vibrational manifold to the antisymmetric $\nu_2=1$ vibrational manifold. The molecules of the buffer gas are characterized by an absence of energy levels corresponding to wave numbers ($cm^{-1}$) in the range from about $(725-kT)$ $cm^{-1}$ to about $(1087+kT)$ $cm^{-1}$, where T is the temperature of the working gas in degrees Kelvin, and k is Boltzmann's constant approximately given by 0.695 wave numbers per degree Kelvin.

The buffer gas is at a pressure such that the rate of rotational relaxation transitions in the $\nu_2=1$ vibrational manifold due to collisions between buffer gas and ammonia molecules is greater than the pump rate for exciting ammonia molecules from the symmetric ground vibrational manifold to the antisymmetric $\nu_2=1$ vibrational manifold, and such that the aforementioned pump rate is greater than the rate of vibrational relaxation transitions from the $\nu_2=1$ vibrational manifold to the ground vibrational manifold due to collisions between ammonia and buffer gas molecules. An optical resonator in optical communication with the working gas supports laser oscillation over at least the wavelength range extending from about 9.3 μm to about 13.8 μm.

When the pumping laser beam excites ammonia molecules to the antisymmetric $\nu_2=1$ vibrational manifold, collisions with buffer gas molecules cause the excited ammonia molecules to undergo intra-molecular energy transfer to a plurality of energy levels in the symmetric $\nu_2=1$ vibrational manifold, thereby establishing population inversion between these energy levels and respective energy levels in the anti-symmetric ground vibrational manifold. As a result, laser oscillation is achieved simultaneously on a plurality of $\nu_2=1$ to ground transitions in the wavelength range extending from about 9.3 μm to about 13.8 μm.

Additional objects, advantages and characteristic features of the invention will become readily apparent from the following detailed description of a preferred embodiment of the invention when considered in conjunction with the accompanying drawings.

DESCRIPTION OF A PREFERRED EMBODIMENT

Figure 1:
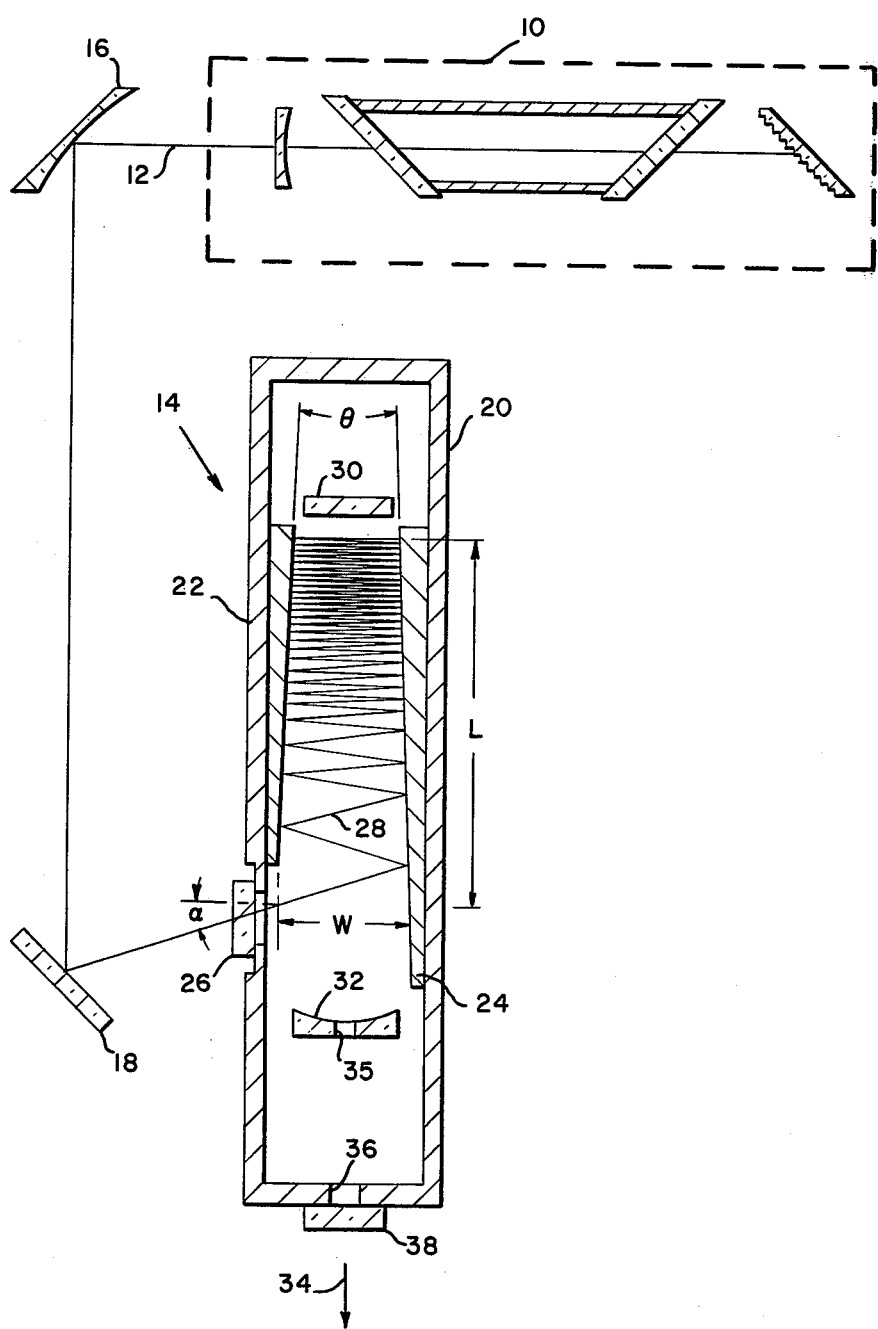
FIG. 1 is a schematic diagram illustrating a laser-pumped laser according to the invention.

Referring to FIG. 1 with greater particularity, a laser-pumped laser according to the invention utilizes a pump laser 10 to generate a pumping laser beam 12 for exciting a main laser 14 which provides the desired laser output. The pump laser 10 is a carbon dioxide ($CO_2$) laser operating on the R(30) 9.2 μm transition of the 001–020 band. A specific exemplary pump laser 10 which has been employed in an arrangement according to the invention was a pulsed, diffraction grating-controlled $CO_2$ TEA laser operated at a pressure of about 800 Torr and providing a multi-transverse and multi-longitudinal mode output extending over an approximately 4 GHz bandwidth centered at about 9.2 μm. The laser beam pulses 12 were of 3–4 μsec. duration at energy levels ranging between 0.4 and 1.2 Joules.

Although the pump laser 10 may be located so that the pumping beam 12 travels along a linear path to the main laser 14, a more compact arrangement may be achieved by utilizing one or more beam-deflecting mirrors 16 and 18 to direct the pumping beam 12 into a desired folded path toward the main laser 14. Moreover, in order to elongate the cross-section of the pumping beam 12 for more efficient pumping of the laser 14, one of the mirrors such as 16 may be made with a paraboloidal reflective surface which receives the pumping beam 12 at an angle offset from the paraboloidal axis. In a specific exemplary arrangement constructed according to FIG. 1, a paraboloidal mirror 16 was employed having a 2.5 m focal length and located a distance of approximately 3 m from the input to the laser 14 along the path of the pumping beam 12. Such an arrangement produced at the input to the laser 14 a laser beam having cross-sectional dimensions of approximately 7 mm × 16 mm, the longer dimension occurring in a plane perpendicular to the plane of FIG. 1.

The main laser 14 includes an elongated housing 20 containing a working gas comprising ammonia as the laser medium and a buffer gas described in more detail below. In a specific exemplary laser which was constructed, housing 20 had a rectangular cross-section of approximately 4 cm × 4 cm dimensions. However, it should be understood that alternate configurations and dimensions are also suitable and may be employed. In fact, a laser cavity width which more closely matches the diameter (e.g., 1 cm) of the transverse laser mode being generated could result in the achievement of more efficient pumping and higher laser output power.

In order to form a pumping cavity for the laser 14 a pair of wedged mirrors 22 and 24 are respectively mounted on a pair of opposing inner walls of the housing 20. The mirrors 22 and 24 are provided with highly reflective surfaces (formed from a gold coating, for example) facing one another and inclined a preselected oblique angle $\theta$ with respect to one another.

The pumping laser beam 12 is introduced into the laser 14 via a window 26 (of KBr, for example) disposed adjacent to the diverging end of mirror 22 at a predetermined angle $\alpha$ with respect to the normal to the reflective surface of the mirror 22. Due to the converging reflective surfaces of the mirrors 22 and 24, the pumping beam 12 propagates through the laser 14 along a zig-zag path 28 back and forth between the mirrors 22 and 24 and in a longitudinal direction toward the converging ends of the mirrors 22 and 24. Moreover, at each reflection from mirror 22 and 24 the angle of reflection with respect to the normal to the surface in question decreases. Eventually, the reflection angle will equal zero or will become negative, causing the pumping beam 12 to reverse its longitudinal direction of propagation and commence a similar zig-zag propagation back through the laser 14 in the opposite longitudinal direction.

The relationship between the pumping beam input angle $\alpha$ and the mirror convergence angle $\alpha$ which results in a reversal of the longitudinal direction of propagation of the pumping beam 12 after traveling longitudinally through the laser 14 for a distance L is given by $$\alpha = \sqrt{2\theta(L/W)},$$

where W is the width of the laser 14 (i.e., the separation between the reflective surfaces of mirrors 22 and 24) at the region of entrance of the pumping beam 12, and $\alpha$ and $\theta$ are measured in radians. For efficient pumping and maximum laser gain, the pumping beam 12 should propagate longitudinally through the laser 14 to approximately the ends of the wedged mirrors 22 and 24 before it reverses its longitudinal direction of propagation.

A set of exemplary parameter values which have been employed for the parameters $\alpha$, $\theta$, L and W in a laser according to the invention is listed below in Table I:

Table I

| | |
|---|---|
| $\alpha$ | $= 15°$ |
| $\theta$ | $= 0.5°$ |
| L | = 18 cm |
| W | = 4 cm. |

It should be understood that the foregoing parameter values are given solely for illustrative purposes, and a wide range of alternate values are also suitable and may be employed.

An optical resonator for the laser 14 may be provided by locating a pair of resonator mirrors such as flat mirror 30 and spherical mirror 32 along the axis of the laser 14 beyond the opposite ends of the pumping region. The resonator mirrors 30 and 32 should be sufficiently reflective to support laser oscillation over at least a wavelength range extending from about 9.3 $\mu$m to about 13.8 $\mu$m. In order to permit egress of the generated laser beam 34 from the laser 14, one of the resonator mirrors such as 32 may be provided with a coupling hole 35 which is aligned with an aperture 36 in the end of housing 20 and an adjacent output window 38 (of KBr, for example). In a specific exemplary resonator which has been employed in an arrangement according to the invention, both of the mirrors 30 and 32 were gold-coated, with spherical mirror 32 having a 1 m radius of curvature and a 1 mm diameter coupling hole 35. Either or both of the mirrors 30 and 32 may be mounted on suitable gimbals (not shown) to facilitate alignment of the mirrors.

As was mentioned above, the housing 20 contains a working gas comprising ammonia ($^{14}NH_3$) and a buffer gas. Typical ammonia pressures may range from about 0.4 Torr to about 2.5 Torr for a pump beam energy of about 1 Joule, although it should be understood that higher ammonia pressures may be employed as the pumping energy is increased.

The selection of an appropriate buffer gas is governed by several requirements. First, the buffer gas must be chemically non-reactive with ammonia. Second, the buffer gas molecules must have an energy level structure such that there are no allowed transitions at wavelengths corresponding to energies within $\pm 1kT$ (where T is the temperature of the gas, and k is Boltzmann's constant) of either the pumping transition or any desired lasing transition. For a pumping wavelength of 9.2 $\mu$m and lasing wavelengths ranging from 9.3 $\mu$m to 13.8 $\mu$m, this requirement corresponds to an absence of energy levels corresponding to wave numbers (cm$^{-1}$) in the range from about (725−kT) cm$^{-1}$ to about (1087+kT) cm$^{-1}$, where T is given in degrees Kelvin, and k is approximately given by 0.695 wave numbers per degree Kelvin. At room temperature (approximately 300° K.), kT$\simeq$200 cm$^{-1}$; hence, at this operating temperature the buffer gas molecules should not have any energy levels corresponding to wave numbers in the range from about 525 cm$^{-1}$ to about 1287 cm$^{-1}$. Examples of suitable buffer gases meeting the foregoing criteria are nitrogen, oxygen, hydrogen, helium, neon, argon, krypton, xenon and air.

In addition to the foregoing requirements, the buffer gas pressure must lie within a particular range related to the pump rate for exciting the ammonia molecules. In order to facilitate understanding of the limitations on buffer gas pressure, operation of a laser according to the invention will first be described with reference to FIG. 2 which illustrates ammonia ($^{14}NH_3$) molecular energy levels and transitions pertinent to the present invention.

Figure 2:
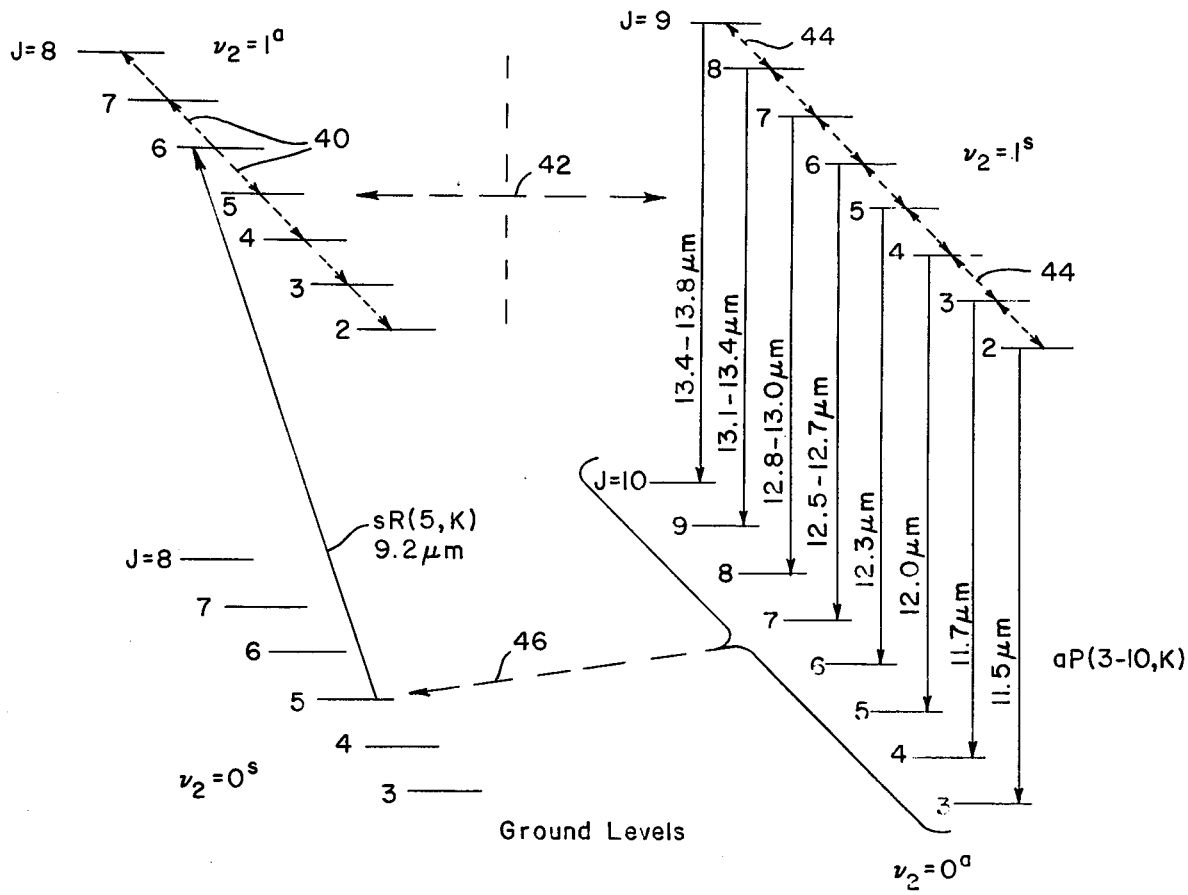
FIG. 2 is an energy level diagram illustrating the pumping mechanism and the stronger lasing transitions for the laser of the invention.

In FIG. 2 and elsewhere herein the following standard notation for symmetric top molecular energy levels is used. "$\nu_2$" represents the normal vibrational mode wherein the nitrogen atom vibrates perpendicular to the plane of the hydrogen atoms, i.e., parallel to the molecular axis of symmetry. A double-welled potential occurs for the $\nu_2$ vibration which has the effect of splitting each vibrational state into two levels, one having symmetric and the other having antisymmetric wave functions with respect to the hydrogen plane. These levels are designated "s" and "a", respectively. In addition, "J" is a rotational quantum number representing the total angular momentum of the molecule, "K" is a rotational quantum number representing the component of molecular angular momentum about the unique axis of the molecule, "R" represents a transition wherein the change in molecular angular momentum $\Delta J$ from the lower level to the upper level is plus one, "Q" represents a transition wherein the change in molecular angular momentum $\Delta J$ from the lower level to the upper level is zero, and "P" represents a transition wherein the change in molecular angular momentum $\Delta J$ from the lower level to the upper level is minus one.

When the pumping laser beam 12 irradiates the working gas contained within the housing 20 of the laser 14, ammonia molecules absorb the pumping energy on sR(5,K) transitions, thereby exciting these ammonia molecules from symmetric (5,K) energy substates of the ground (J,K) vibrational manifold to antisymmetric (6,K) energy substates of the $\nu_2=1$ (J,K) vibrational manifold. The excited (6,K) ammonia molecules undergo collisions with buffer gas molecules, causing some of these molecules to gain or lose sufficient energy to populate other antisymmetric $\nu_2=1$ energy levels with J-values ranging approximately from 2 to 8, as shown by dashed lines 40 in FIG. 2. Further collisions between excited ammonia molecules in the antisymmetric (2−8,K) $\nu_2=1$ energy levels and buffer gas molecules cause ammonia molecules in these excited states to undergo intra-molecular energy transfer to various energy levels of the symmetric $\nu_2=1$ vibrational manifold having J-values ranging approximately from 2 to 9, as shown by dashed line 42 of FIG. 2. Moreover, after ammonia molecules have reached the symmetric $\nu_2=1$ manifold, further collisions with buffer gas molecules produce intra-molecular energy transfer among the various symmetric (2−9,K) $\nu_2=1$ energy levels, as shown by dashed lines 44 of FIG. 2, thereby enchancing the spreading of population to the various symmetric (2−9,K) $\nu_2=1$ levels.

The aforedescribed intra-molecular energy transfer via collisions with buffer gas molecules creates a population inversion in the ammonia molecules between respective (2−9,K) symmetric $\nu_2=1$ energy levels and respective (3−10,K) antisymmetric ground levels characterized by P-transitions therebetween. As a result, laser oscillation is achieved simultaneously on a plurality of aP(3−10,K) ammonia transitions from symmetric $\nu_2=1$ levels to antisymmetric ground levels, and a corresponding multi-line laser output beam 34 is provided from the laser 14.

After laser emission to the antisymmetric (3−10,K) ground states, collisions between ammonia molecules in these states and buffer gas molecules produce further intra-molecular energy transfer of ammonia molecules back to the symmetric (5,K) ground levels, as shown by dashed line 46 in FIG. 2. This last-mentioned energy transfer functions to deplete the population of the lower levels of the aP (3-10,K) lasing transitions as well as to replenish the population of the lower level of the sR(5,K) pumping transition, thereby acheiving an enhanced pumping effect. Such enhanced pumping not only increases the laser operating efficiency, but also results in a laser output of longer pulse duration.

Figure 3:
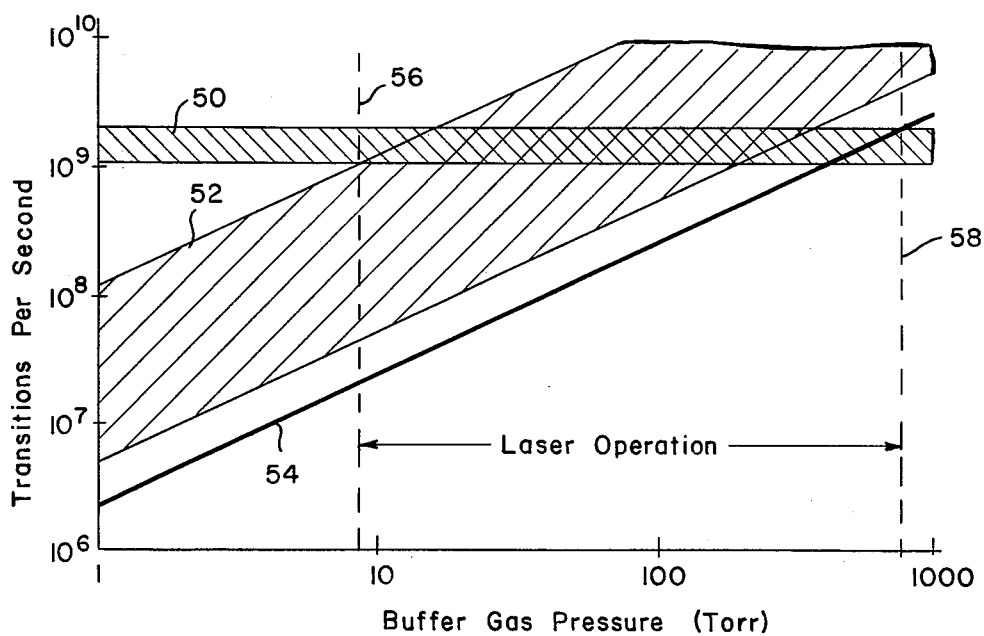
FIG. 3 is a simplified graph plotting rates of pumping, vibrational relaxation, and rotational relaxation as a function of buffer gas pressure for a laser according to the invention.

As was mentioned above, in order to obtain lasing in accordance with the invention, the buffer gas pressure must lie within a particular range related to the pump rate for exciting the ammonia molecules. The relationship between buffer gas pressure, pump rate and other pertinent physical processes involving the ammonia molecules are illustrated in the simplified graph of FIG. 3. In FIG. 3, band 50 illustrates the pump rate for exciting ammonia molecules from the symmetric ground vibrational manifold to the antisymmetric $\nu_2=1$ vibrational manifold, band 52 shows the rate of rotational relaxation transitions in the $\nu_2=1$ vibrational manifold due to collisions between buffer gas and ammonia molecules, and line 54 depicts the rate of vibrational relaxation transitions (V—V) from the $\nu_2=1$ vibrational manifold to the ground vibrational manifold due to collisions between ammonia and buffer gas molecules, all plotted as a function of buffer gas pressure. Included in band 52 are transitions between antisymmetric and symmetric energy states (a→s and s→a) characterized by the same rotational quantum numbers J and K, as well as transitions for which either of the rotational quantum numbers J and K increases or decreases by an integer.

It may be seen from FIG. 3 that at low buffer gas pressures the pump rate (represented by band 50) exceeds the collisional rotational relaxation rate in the $\nu_2=1$ manifold (represented by band 52). Thus, at these buffer gas pressures intra-molecular energy transfer by collisions with buffer gas molecules is insufficient to establish population inversion between symmetric $\nu_2=1$ energy levels and antisymmetric ground levels, and lasing according to the present invention is not possible. However, when the buffer gas pressure exceeds the value represented by dashed line 56, some rotational relaxation rates in the $\nu_2=1$ manifold begin to exceed the pump rate, and population inversion becomes established between some symmetric $\nu_2=1$ levels and associated antisymmetric ground levels. Hence, lasing according to the invention commences on a few ammonia lines.

As the buffer gas pressure is increased further, the rates for more rotational relaxation processes in the $\nu_2=1$ manifold exceed the pump rate, and population inversion becomes established between additional symmetric $\nu_2=1$ levels and associated antisymmetric ground levels, thereby achieving lasing on additional ammonia lines. However, since lasing on more and more lines requires the spreading of population to more and more upper laser energy levels in the symmetric $\nu_2=1$ manifold, eventually a point is reached for which lasing on some ammonia lines terminates for further increases in buffer gas pressure.

When the buffer gas pressure is increased beyond the value represented by dashed line 58 in FIG. 3, the rate of vibrational relaxation transitions from the $\nu_2=1$ vibrational manifold to the ground vibrational manifold (represented by line 54) exceeds the pump rate (shown by band 50). At buffer gas pressures in excess of this value, the population of the symmetric $\nu_2=1$ states decreases too rapidly to permit the establishment of population inversion with respect to antisymmetric ground states, and lasing according to the invention is no longer possible.

Thus, it will be apparent that a laser according to the invention operates in the buffer gas pressure regime shown between lines 56 and 58 in FIG. 3, i.e., at buffer gas pressures such that the rate of rotational relaxation transitions in the $\nu_2=1$ vibrational manifold due to collisions between buffer gas and ammonia molecules is greater than the pump rate for exciting ammonia molecules from the symmetric ground vibrational manifold to the antisymmetric $\nu_2=1$ vibrational manifold, and such that the aforementioned pump rate is greater than the rate of vibrational relaxation transitions from the $\nu_2=1$ vibrational manifold to the ground vibrational manifold due to collisions between ammonia and buffer gas molecules.

It should be noted that in the past lasing on ammonia lines between different rotational energy levels within the $\nu_2=1$ manifold has been achieved at wavelengths ranging from 67 $\mu$m to 388 $\mu$m by pumping with the R(30) $CO_2$ laser line in the presence of a buffer gas (see K. Gullberg et al, supra). However, these lines resulted solely from either direct optical pumping or optical pumping followed by lasing to the upper energy level of the lasing transition in question. These lines do not rely upon a buffer gas in any way for their generation; in fact they are extinguished when the pressure of any buffer gas reaches a value for which any rotational relaxation rate in the $\nu_2=1$ manifold exceeds the pump rate. With reference to FIG. 3, the operating regime for the Gullberg et al ammonia lines is to the left of boundary 56, whereas the operating regime for a laser according to the invention lies to the right of boundary 56 and to the left of boundary 58. Note, also, that boundary 58 moves to higher pressures for higher pump rates. Thus, the upper pressure limit is primarily dependent on the energy output capability of the $CO_2$ pump laser, and which output is scalable to exceedingly higher energy.

A laser according to the invention constructed with the aforedescribed specific exemplary parameter values had a pump rate (band 50) of about $2 \times 10^9$ transitions per second per $cm^3$, an average rotational relaxation rate coefficient (band 52) of about $5 \times 10^7$ transitions per second per $cm^3$ per Torr, and a vibrational relaxation rate coefficient (line 54) of about $2 \times 10^6$ transitions per second per $cm^3$ per Torr. It may be seen from FIG. 3 that for a pump rate of $2 \times 10^9$ transitions per second per $cm^3$, lasing according to the invention may be achieved with buffer gas pressures ranging from about 10 Torr to about 800 Torr. However, a greater number of ammonia lines are generated when the buffer gas pressure is at an intermediate value, preferably ranging from about 40 Torr to about 300 Torr.

A list of 40 ammonia laser lines which have been obtained with a laser according to the invention constructed with the aforedescribed specific exemplary parameters values is given in Table II. It should be noted that lines 1–10 in Table II were generated using an ammonia pressure of 0.4 Torr, while lines 11–40 were obtained with an ammonia pressure of 1.7 Torr. Nitrogen ($N_2$) was employed as the buffer gas in all cases given in Table II; however, only specific nitrogen pressures of 26, 40, 61, 72, 86, 103, 250, 300, 350, 400, 450, 500, 550, 600 and 650 Torr were used. The transitions were identified by comparing the measured wave numbers with values listed in Garing et al, supra.

TABLE II

| Line No. | Wavelength (μm) ± 0.010 μm | Wave Number (cm$^{-1}$) ±1.0 | Probable Transition(s) | Buffer Gas Pressure (Torr) | Relative Output at Optimum Buffer Gas Pressure |
|---|---|---|---|---|---|
| 1 | 9.3 | 1070 | aR(6,K) | 70 | <5 |
| 2 | 9.6 | 1037 | aR(4,K), sR(3,K) | 70 | <5 |
| 3 | 9.7 | 1027 | aR(3,1), aR(2,2), aR(2,1), aR(4,4), aR(4,3) | 70 | <5 |
| 4 | 9.9 | 1008 | aR(2,0), sR(1,1), sR(1,0), aR(3,3), aR(3,2) | 70 | <5 |
| 5 | 10.2 | 979 | aR(1,1) | 70 | <5 |
| 6 | 10.5 | 949 | sP(1,0) | 70 | <5 |
| 7 | 10.6 | 941 | aQ(9,3), aQ(10,4), aQ(9,2), aQ(10,3), aQ(9,1) | 70 | <5 |
| 8 | 10.7 | 931 | aQ(8,6), aQ(9,7), aQ(6,5), aQ(3,3), aQ(5,4), aQ(5,5), aQ(7,6), aQ(4,4), aQ(2,2) | 70 | <5 |
| 9 | 11.0 | 910 | sP(3,K), aQ(13,13) | 70 | <5 |
| 10 | 11.466 | 872.1 | aP(3,2), aP(3,1) | 70 | <5 |
| 11 | 11.721 | 853.2 | aP(4,K) | 40–650 | >1000 |
| 12 | 11.994 | 833.8 | aP(5,2), aP(5,1) | 40–300 | >1000 |
| 13 | 12.010 | 832.6 | aP(5,3), aP(5,4) | 40–250 | >1000 |
| 14 | 12.251 | 816.3 | aP(6,1), aP(6,0) | 40–650 | >1000 |
| 15 | 12.266 | 815.3 | aP(6,2) | 0–250 | >1000 |
| 16 | 12.286 | 813.9 | aP(6,3) | 0–250 | >1000 |
| 17 | 12.316 | 812.0 | aP(6,4) | 40–150 | >1000 |
| 18 | 12.348 | 809.8 | aP(6,5) | 40 | 80 |
| 19 | 12.526 | 798.3 | aP(7,1) | 40–200 | >1000 |
| 20 | 12.541 | 797.4 | aP(7,2) | 40–200 | >1000 |
| 21 | 12.566 | 795.8 | aP(7,3) | 40–103 | 150 |
| 22 | 12.591 | 794.2 | aP(7,4) | 40 | 30 |
| 23 | 12.631 | 791.7 | aP(7,5) | 40–103 | >1000 |
| 24 | 12.689 | 788.1 | aP(7,6) | 40–103 | >1000 |
| 25 | 12.811 | 780.6 | aP(8,2), aP(8,1), aP(8,0) | 40–200 | >1000 |
| 26 | 12.851 | 778.1 | aP(8,3) | 40–250 | >1000 |
| 27 | 12.876 | 776.6 | aP(8,4) | 40–103 | 650 |
| 28 | 12.921 | 773.9 | aP(8,5) | 40–72 | 650 |
| 29 | 12.971 | 771.0 | aP(8,6) | 26–200 | 1000 |
| 30 | 13.031 | 767.4 | aP(8,7) | 40 | 180 |
| 31 | 13.114 | 762.5 | aP(9,1) | 40–86 | 150 |
| 32 | 13.125 | 762.0 | aP(9,2) | 40 | 150 |
| 33 | 13.145 | 760.7 | aP(9,3) | 26–103 | 750 |
| 34 | 13.176 | 759.0 | aP(9,4) | 40 | 150 |
| 35 | 13.218 | 756.5 | aP(9,5) | 40–61 | 150 |
| 36 | 13.269 | 753.6 | aP(9,6) | 40–103 | 900 |
| 37 | 13.331 | 750.1 | aP(9,7) | 40 | 200 |
| 38 | 13.411 | 745.7 | aP(9,8), aP(10,1), aP(10,0) | 40–72 | 60 |
| 39 | 13.576 | 736.6 | aP(10,6) | 40–61 | 120 |
| 40 | 13.821 | 723.5 | aP(10,9) | 40 | 120 |

From the foregoing it may be seen that the present invention provides an ammonia laser which lases simultaneously on a large number of different ammonia lines spaced throughout the 9–14 μm wavelength range. With such a laser, pressure broadening may be employed to achieve tunability of the laser output to any wavelength over substantially the entire 9–14 μm wavelength range. At the same time, a laser-pumped laser is provided which employs a unique pumping mechanism involving intra-molecular energy transfer via a buffer gas to achieve an enhanced pumping effect resulting in increased operating efficiency and longer output pulse duration.

Although the invention has been shown and described with reference to particular embodiments, nevertheless various changes and modifications which are obvious to a person skilled in the art to which the invention pertains are deemed to lie within the purview of the invention.

What is claimed is:

1. A laser comprising:
    a housing;
    a quantity of working gas contained within said housing, said working gas comprising ammonia and a buffer gas which is chemically non-reactive with ammonia;
    a carbon dioxide laser tuned to the R(30) transition of the 001–020 band for providing a pumping laser beam at a wavelength of approximately 9.2 μm;
    means for causing said pumping laser beam to irradiate said working gas to excite ammonia molecules from the symmetric ground vibrational manifold to the antisymmetric $\nu_2 = 1$ vibrational manifold;
    the molecules of said buffer gas having an absence of energy levels corresponding to wave numbers in the range from about $(725-kT)$ cm$^{-1}$ to about $(1087+kT)$ cm$^{-1}$, where T is the temperature of said working gas in degrees Kelvin, and k is Boltzmann's constant approximately given by 0.695 wave numbers per degree Kelvin;

said buffer gas being at a pressure such that the rate of rotational relaxation transitions in the $\nu_2=1$ vibrational manifold due to collisions between buffer gas and ammonia molecules is greater than the pump rate for exciting ammonia molecules from the symmetric ground vibrational manifold to the antisymmetric $\nu_2=1$ vibrational manifold, and such that said pump rate is greater than the rate of vibrational relaxation transitions from the $\nu_2=1$ vibrational manifold to the ground vibrational manifold due to collisions between ammonia and buffer gas molecules; and an optical resonator in optical communication with said working gas for supporting laser oscillation over at least the wavelength range extending from about 9.3 μm to about 13.8 μm.

2. A laser according to claim 1 wherein said buffer gas is selected from the group consisting of nitrogen, oxygen, hydrogen, helium, neon, argon, krypton, xenon and air.

3. A laser according to claim 1 wherein the ammonia gas within said housing is at a pressure ranging from about 0.4 Torr to about 2.5 Torr, and said buffer gas is nitrogen at a pressure ranging from about 40 Torr to about 300 Torr.

4. A laser according to claim 3 wherein said ammonia gas is at a pressure of about 1.7 Torr, and said nitrogen gas is at a pressure of about 40 Torr.

* * * * *